Nov. 2, 1926.
E. E. A. G. MEYER ET AL
1,605,684
TIRE MOLD
Original Filed June 12, 1920
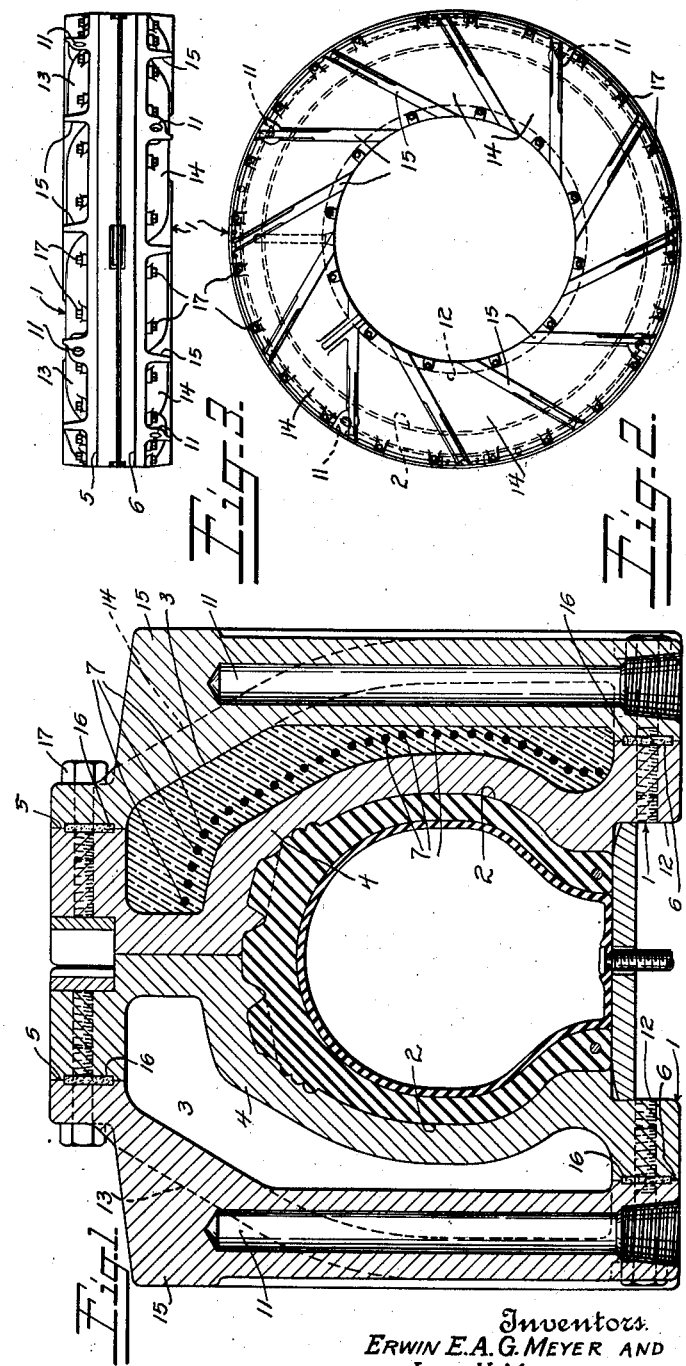
Inventors.
ERWIN E.A.G. MEYER AND
JOHN H. MULLOY,
By their Attorney,
Ernest Hopkinson Patented Nov. 2, 1926.

1,605,684

UNITED STATES PATENT OFFICE.

ERWIN E. A. G. MEYER AND JOHN H. MULLOY, OF DETROIT, MICHIGAN, ASSIGNORS TO MORGAN & WRIGHT, OF DETROIT, MICHIGAN, A CORPORATION OF MICHIGAN.

TIRE MOLD.

Original application filed June 12, 1920, Serial No. 388,412. Divided and this application filed February 5, 1923. Serial No. 616,979.

This invention relates to an apparatus for curing tires.

The present invention aims to provide a mold of a construction suited to the practical operations of tire manufacture. It is an object to provide a mold which shall be comparatively light in weight and so shaped as to be easily stacked.

Briefly, the mold of the present invention may be said to consist of mating annular sections provided with the usual grooved faces for forming the exterior of a tire, each of the sections being provided with a closed annular chamber, and stacking ribs formed on opposite sides of the sections.

This application is a division of our previously filed application Serial No. 388,412, filed June 12, 1920.

An embodiment of the invention is illustrated in the accompanying drawings in which—

Fig. 1 represents a cross-section through the mold and

Fig. 2 shows the mold in plan view.

Fig. 3 shows side elevation of Fig. 2.

In the drawings, mating annular sections 1 are shown provided with the usual oppositely grooved inner faces 2, defining a tire receiving cavity which during vulcanization or curing imparts the desired configuration to the exterior of the tire. Each of the sections is preferably, but not necessarily, made of cast-steel and is provided with an annular and completely closed chamber 3 of the shape in cross-section illustrated in Fig. 1, following or conforming very closely to the contour of the tire on the side nearest the tire receiving cavity. The wall 4 between each chamber 3 and the tire cavity is of substantially uniform thickness throughout and thus insures conduction of heat at a uniform rate through all portions of the tire in contact therewith. The sections are split circumferentially, as indicated at 5 and 6, to facilitate the introduction of insulated electrical heating elements within each chamber.

The mold is preferably, but not necessarily, provided with wells 11, which may be put in any desired location in each of its sections for the reception of temperature indicating or regulating devices and these wells may be located as shown or adjacent the tread or otherwise if desired.

The mold illustrated is adapted to receive a bull ring between the undercut portions 12 for that method of vulcanization in which the tire is held by internal fluid pressure against the opposed grooved faces 2 during the cure, but obviously, the mold may be used for curing tires built on cores. Air bags or "dams" on the bull ring may be used with an internal fluid pressure. The wells 11 illustrated may be used to receive instruments controlling the temperature of the mold during vulcanization by either of the above mentioned methods, but when a bull ring is employed in conjunction with internal fluid pressure, it may be apertured to receive the temperature indicating and regulating instruments.

Over the major portion of its surface the opposite sides 13 and 14 of the mold are curved more or less convexly in order to reduce the quantity of metal that has to be heated and hence the current consumed during each cure. To effect this economy however, and yet to permit the molds to be stacked upon one another as usual, ribs or projections 15 are formed integral with or otherwise suitably fixed to the outer sides of the mold, as illustrated. These ribs or projections 15 may be arranged transverse the annulus in any suitable shape and direction, preferably however as shown in nonradial direction and their extremities or side faces terminate substantially in planes parallel to the body of the core. Obviously, the molds may be placed upon one another with their ribs or projections crossing at a sufficient angle to make stacking a plurality of the molds a practical operation.

It will be noticed that the split portions 5 and 6 of the sections are recessed to receive gaskets or packing 16 which, when the two parts of each section are secured together by the bolts 17, render the chambers 3 water tight. This is a desirable feature of the invention, as it permits immersion of the mold in water or other cooling fluid after vulcanization when the tire is cured on a core.

After vulcanization the tire is cooled either externally by immersion of the mold in a cooling medium or internally by circulating a cooling medium through the cavity, the latter method being preferred especially for tires which are inflated internally by gas during vulcanization because "blowing" from the internal fluid or gas under pressure that finds its way between the plies of fabric or between the carcass and the tread has been found to be materially diminished, if not eliminated, by supplying the cooling medium to the inside of and in direct contact with the tire. The cooling medium, preferably water under pressure of about 200 pounds or under a pressure substantially equal to that of the internal gas during the cure, may be satisfactorily circulated through the tire cavity by means of a gooseneck outlet valve terminating at a point adjacent the top of the tire cavity wherever that may happen to be. Desirably, the circulated fluid may be used to displace the gas. Carbon dioxide is commonly used as an internal fluid pressure medium, and commonly it is under a pressure in the neighborhood of 200 pounds to the square inch. The internal cooling of the tire is regarded as a valuable feature of the present invention. The cooling medium does not have to reduce the temperature of the encompassing mold, time is saved, and the mold for this reason may be brought up to "heat" more quickly in a subsequent curing operation than if it had been cooled by external immersion. Internal cooling enables the temperature of the tire to be lowered to the desired extent, usually in the neighborhood of 100° F., without diminishing the pressure on its interior which thrusts it outwardly against the confining walls of the mold. And "blowing" is also reduced, if not prevented, by circulating water under pressure internally of the tire.

It will thus be seen that we have provided a unitary vulcanizing apparatus which saves space by eliminating the steam process heretofore used, which reduces loss of heat by radiation, which promotes cleanliness, and which appreciably reduces the labor involved in manipulating the molds. And these results are obtained without much departure from standardized practice and hence, without the necessity of modifying the methods and apparatus employed in building the tire preparatory to vulcanization.

Having thus described our invention, what we claim and desire to protect by Letters Patent is:

A tire mold having a plurality of mating metallic annular sections, each of said sections being provided with a closed annular chamber and having a removable member defining a portion of said chamber, and stacking ribs formed on the opposite sides of said sections.

Signed at Detroit, county of Wayne, and State of Michigan, this 1st day of February, 1923.

ERWIN E. A. G. MEYER.
JOHN H. MULLOY.